(12) United States Patent
Kim et al.

(10) Patent No.: US 9,833,716 B2
(45) Date of Patent: Dec. 5, 2017

(54) WEB CONTENT SHARING METHOD, AND WEB CONTENT PROVIDING APPARATUS AND RECEIVING TERMINAL FOR WEB CONTENT SHARING

(71) Applicant: Electronics and Telecommunications Research Institute, Daejeon (KR)

(72) Inventors: Min Jung Kim, Daejeon (KR); Moon Soo Lee, Daejeon (KR); Seung Joon Kwon, Seoul (KR); Kee Seong Cho, Daejeon (KR); Won Ryu, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 251 days.

(21) Appl. No.: 14/550,581

(22) Filed: Nov. 21, 2014

(65) Prior Publication Data
US 2015/0148128 A1    May 28, 2015

(30) Foreign Application Priority Data

Nov. 22, 2013  (KR) .................. 10-2013-0143170
Sep. 15, 2014  (KR) .................. 10-2014-0122268

(51) Int. Cl.
| | | |
|---|---|---|
| *G06F 17/00* | (2006.01) | |
| *A63F 13/86* | (2014.01) | |
| *H04L 29/08* | (2006.01) | |
| *A63F 13/355* | (2014.01) | |
| *A63F 13/35* | (2014.01) | |
| *A63F 13/60* | (2014.01) | |

(52) U.S. Cl.
CPC .............. *A63F 13/86* (2014.09); *A63F 13/35* (2014.09); *A63F 13/355* (2014.09); *A63F 13/60* (2014.09); *H04L 67/02* (2013.01)

(58) Field of Classification Search
USPC ...................................................... 463/31–33
See application file for complete search history.

(56) References Cited

U.S. PATENT DOCUMENTS

| | | | |
|---|---|---|---|
| 8,037,022 B2* | 10/2011 | Rahman ............ | G06F 17/30017 707/613 |
| 8,271,625 B2* | 9/2012 | Kwon ................. | H04L 12/2812 709/201 |
| 8,386,260 B2 | 2/2013 | Engelsma et al. | |
| 9,372,940 B2* | 6/2016 | Raichelgauz ....... | G06F 17/3002 |
| 2005/0021866 A1 | 1/2005 | Kang et al. | |
| 2005/0108299 A1* | 5/2005 | Nakajima ......... | G06F 17/30902 |

(Continued)

FOREIGN PATENT DOCUMENTS

| | | |
|---|---|---|
| EP | 1819131 A1 | 8/2007 |
| KR | 1020040090330 A | 10/2004 |

(Continued)

*Primary Examiner* — Ronald Laneau
(74) *Attorney, Agent, or Firm* — William Park & Associates Ltd.

(57) ABSTRACT

A web content sharing method, and a web content providing apparatus and a receiving terminal for web content sharing. In the web content sharing method according to an exemplary embodiment, the web content providing apparatus separates a plurality of web content items from a web page, disperses and moves the separated web content to each of the receiving terminals, and synchronizes the dispersed and moved web content between the receiving terminals.

19 Claims, 8 Drawing Sheets

(56) References Cited

U.S. PATENT DOCUMENTS

| | | | |
|---|---|---|---|
| 2011/0202848 A1* | 8/2011 | Ismalon | G06F 17/3089 715/738 |
| 2011/0289393 A1 | 11/2011 | Choi | |
| 2013/0138770 A1 | 5/2013 | Kim et al. | |

FOREIGN PATENT DOCUMENTS

| | | |
|---|---|---|
| KR | 100694161 B1 | 3/2007 |
| KR | 1020100067976 A | 6/2010 |
| KR | 1020100108415 A | 10/2010 |
| KR | 1020110127455 A | 11/2011 |
| KR | 1020130093294 A | 8/2013 |

* cited by examiner

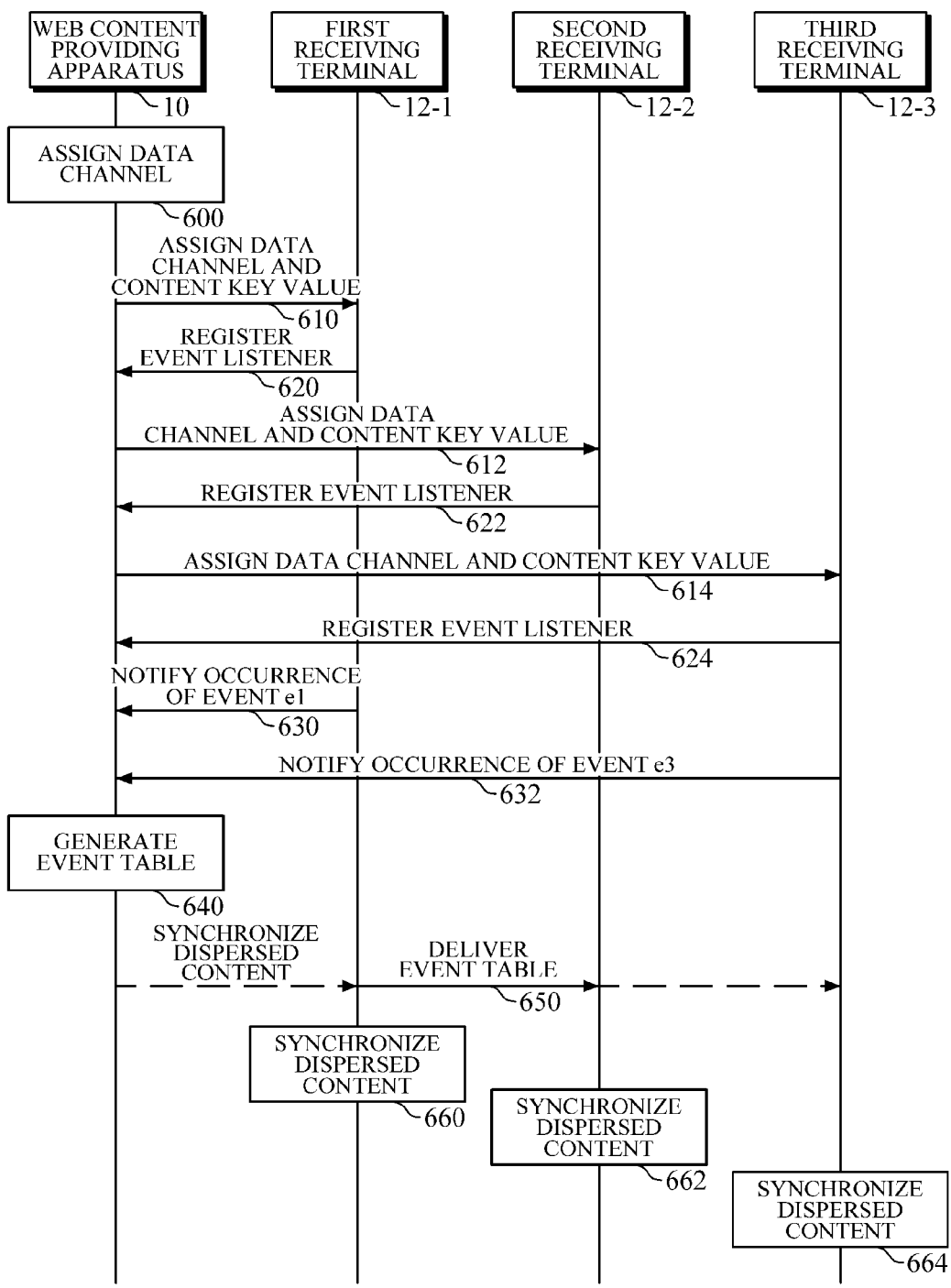

FIG. 7

| DATA | TYPE | DESCRIPTION |
|---|---|---|
| DeviceName | String | TERMINAL NAME |
| DeviceNickname | String | TERMINAL NICKNAME(optional) |
| DeviceModel | String | TERMINAL MODEL NAME |
| DeviceScreenSize | Int | TERMINAL SCREEN SIZE(inch) |
| DeviceResolution | Int, Int | TERMINAL RESOLUTION |
| PreferredContentType | String[] | PREFERRED CONTENT TYPE |
| WebBrowserVer | String | WEB BROWSER TYPE AND VERSION INSTALLED IN TERMINAL |
| DeviceCapability | 2 Bytes | TERMINAL CAPABILITY |

FIG. 8

| DATA | TYPE | DESCRIPTION |
| --- | --- | --- |
| EventType | String | "sendEventToChannel" |
| EventSenderID | String | EVENT TRANSMISSION TERMINAL ID |
| ChannelID | String | CHANNEL NUMBER (ASSIGNED TO DISPERSION EVENT) |
| KeyValue | String | KEY VALUE (TIME) AT TIME OF EVENT OCCURRENCE |
| eventNum | String | EVENT NUMBER |
| receiverID | String[] | TERMINAL ID THAT HAS RECEIVED EVENT (USING WHEN FORWARDING EVENT) |
| DContentID | String | CONTENT ID TO BE SYNCHRONIZED |
| Contents | String[] | EVENT CONTENT |

WEB CONTENT SHARING METHOD, AND WEB CONTENT PROVIDING APPARATUS AND RECEIVING TERMINAL FOR WEB CONTENT SHARING

CROSS-REFERENCE TO RELATED APPLICATION(S)

This application claims the benefit under 35 U.S.C. §119 (a) of Korean Patent Application Nos. 10-2013-0143170, filed on Nov. 22, 2013, and 10-2014-0122268, filed on Sep. 15, 2014, in the Korean Intellectual Property Office, the entire disclosures of which are incorporated herein by references for all purposes.

BACKGROUND

1. Field

The following description relates to web content service technology.

2. Description of the Related Art

As the number of smartphones increases and its performance is improved, technology of sharing and controlling media content between devices using Digital Living Network Alliance (DLNA) technology is generalized. Using a Group Play function, media content can be shared and multi-play games can be played between various devices that are joined to the group. In the case of Group Play, if a user executes each app and joins a channel in a state where an identical application (hereinafter referred to as 'app') is installed in every device, data can be shared between the apps, and each different function can be performed in the identical app by using the shared data. Although a multi-mode operation can be executed through the data sharing in Group Play, an app itself should provide a function of executing a multi-mode operation. In addition, for a normal operation of the multi-mode, the identical app should be installed in every device. Thus, because a function can be executed only after an identical app is installed in every device, efficiency decreases as the types of apps increases, and as a result, usability is reduced.

Due to performance improvement of web browsers, an area of the web content is extended to not only an existing web page, but also a web application program. In a case of current multi-mode technology, which is in a state of focusing on content sharing, there is a limit to the separation of web content functions and its execution according to attributes of a device. Web Intents technology is provided as a method for data linkage and Service Discovery, which is in a progress of standardization by the World Wide Web Consortium (W3C). However, Web Intents can enable the registered service and the already set data to be exchanged, and does not cover communications between the web content distributed in each device.

As the number of smart devices that an individual possesses increases, there is a demand for distributing and consuming web content of complex composition to fit that purpose of the device. However, in a case of using the existing web page sharing technology, all devices may share the same screen because the individual uses a URL-based sharing technology or a mirroring technique.

SUMMARY

Provided are a web content sharing method, and a web content providing apparatus and a receiving terminal for web content sharing so as to disperse each different web content from a web page to each of devices and synchronize the web content dispersed to each of the devices.

In a general aspect, a web content sharing method of a web content providing apparatus includes: separating a plurality of web content items from a web page; dispersing and providing the plurality of the separated web content items to each of receiving terminals; and synchronizing the plurality of web content items that has been dispersed to and executed in each of the receiving terminals.

The separating of the plurality of web content items may include separating a video for a lecture, a presentation material for a lecture, and a web application program that executes questions for evaluation from the web page. The dispersing and providing of the plurality of separated web content items may include providing the separated video to a first receiving terminal, the separated presentation material to a second receiving terminal, and the separated web application to a third receiving terminal. The synchronizing of the plurality of web content items may include changing the presentation material, which is displayed on the second receiving terminal, according to a point in time when the video that is being played in the first receiving terminal is played, and in response to ending of the video played in the first receiving terminal, executing the web application program through the third receiving terminal.

In another general aspect, a web content sharing method of a web content providing apparatus includes: receiving a terminal profile from each of receiving terminals; separating a plurality of web content items from a web page; assigning the plurality of web content items to each of the receiving terminals by reflecting the terminal profile in the plurality of separated web content items; and providing the plurality of assigned web content items to each of the receiving terminals.

In another general aspect, a web content providing apparatus includes a content processor to separate a plurality of web content items from a web page, and disperse and assign the plurality of separated web content items to each of receiving terminals; a content provider to provide each of the receiving terminals with the plurality of web content items that has been assigned to each of the receiving terminals through the content processor; and a synchronization processor to synchronize the plurality of web content items that has been dispersed to each of the receiving terminals.

BRIEF DESCRIPTION OF THE DRAWINGS

FIG. 6 is a diagram illustrating a synchronization process according to an exemplary embodiment.

FIG. 7 is a diagram illustrating a terminal profile according to an exemplary embodiment.

FIG. 8 is a diagram illustrating an event table according to an exemplary embodiment.

Figure 1:
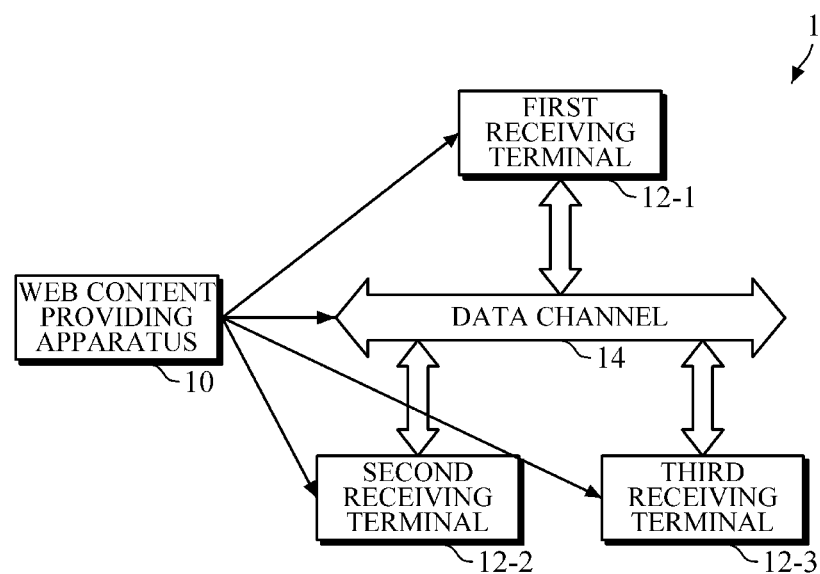
FIG. 1 is a diagram illustrating a web content sharing system according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a web content sharing system according to an exemplary embodiment.

Referring to FIG. 1, a web content sharing system 1 includes a web content providing apparatus 10 and a plurality of receiving terminals. Although FIG. 1 illustration is limited to three receiving terminals—12-1, 12-2, and 12-3, the web content sharing system 1 is not limited to the numbers and types of receiving terminals. The receiving terminals 12-1, 12-2, and 12-3 encompass various devices, such as a PC, a smartphone, a tablet, and a TV, etc., which a user can possess.

The web content providing apparatus 10 separates a plurality of web content items from a web page, and disperses and moves the separated web content, different from each other, to the receiving terminals 12-1, 12-2, and 12-3. For example, the web content providing apparatus 10 separates first web content, second web content, and third web content from a web page, and disperses and moves the separated first web content to the first receiving terminal 12-1, the separated second web content to the second receiving terminal 12-2, and the separated third web content to the third receiving terminal 12-3. The receiving terminals 12-1, 12-2, and 12-3 execute each of the web content, moved from the web content providing apparatus 10, in multi-mode. Each web content dispersed to each of the receiving terminals 12-1, 12-2, and 12-3 is synchronized through a data channel 14.

The web content dispersed to each of the receiving terminals 12-1, 12-2, and 12-3 may be composed of information of an image, a text, and a web application program, etc. Also, the web content may be composed of one web application program that is separable. In addition, the web content may be implemented with a module where an event is capable of being operated in association with other events between the components. For example, the web content may change image content at a specific point in time while video content is played, or execute a web application program at the point in time when a video content ends.

In an exemplary embodiment, a web content providing apparatus 10 disperses a web page, composed of a module where an event is capable of being operated in association with other events between the components, to each of the receiving terminals 12-1, 12-2, and 12-3. Here, the web content providing apparatus 10 reflects a terminal profile and a web content state of each of the receiving terminals 12-1, 12-2, and 12-3 to find the receiving terminal that is optimized to each of the web content and provide the web content to the found receiving terminal. The web content may have data, on a tag as additional information, for extracting the web content state and a terminal capacity, of the receiving terminal, which is required for a web content execution.

The web content providing apparatus 10 according to an exemplary embodiment generates a data channel 14, and through the generated data channel 14 shares the events generated between the web content so as to synchronize the web content that is dispersed and moved to each of the receiving terminals 12-1, 12-2, and 12-3. Thus, after the dispersion of the plurality of web content items to each of the receiving terminals 12-1, 12-2, and 12-3, the association may be maintained between the web content.

Figure 2:
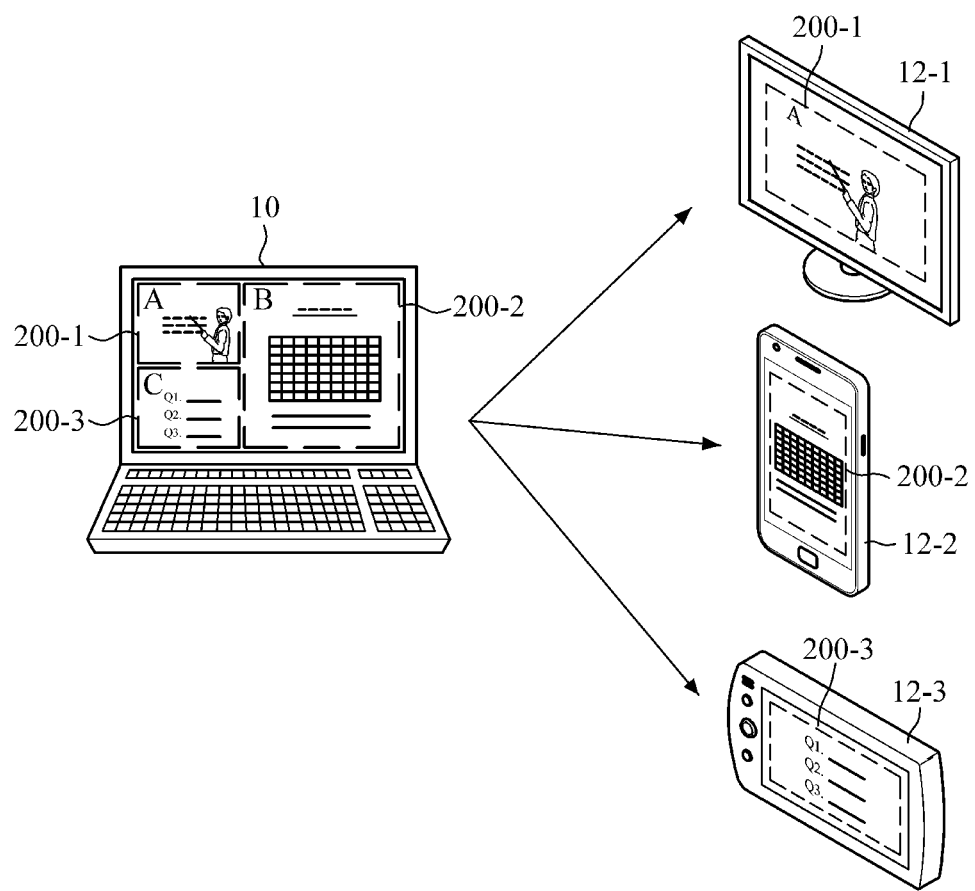
FIG. 2 is a diagram illustrating an example where a web content sharing system is applied according to an exemplary embodiment.

FIG. 2 is a diagram illustrating an example where a web content sharing system is applied according to an exemplary embodiment.

Referring to FIGS. 1 and 2, a web content sharing system 1 may be applied to E-learning. The web page may include the following content: a video 200-1 for a lecture, a presentation material 200-2 for a lecture, and a web application program 200-3 that executes questions for evaluation. A student registering for a lecture possesses a plurality of the receiving terminals 12-1, 12-2, and 12-3 and takes a lecture through them. A web content providing apparatus 10 separates the video 200-1 for a lecture, the presentation material 200-2 for a lecture, and the web application program 200-3 from the web page. Then, the web content providing apparatus 10 disperses and provides the separated video 200-1 to the first receiving terminal 12-1, the presentation material 200-2 to the second receiving terminal, and the web application program 200-3 to the third receiving terminal. The time point for the provisions does not need to be the same.

Subsequently, the web content providing apparatus 10 synchronizes the video 200-1, the presentation material 200-2, and the web application program 200-3 that executes questions for evaluation, which are, respectively, executed in the receiving terminals 12-1, 12-2, and 12-3, and executes a multi-mode. For example, the web content providing apparatus 10 changes an image of the presentation material 200-2, which is displayed on the second receiving terminal 12-2, according to a point in time when the video 200-1 that is being played in the first receiving terminal 12-1 is played. For example, the web content providing apparatus 10 automatically turns the page of the presentation material 200-2 in accordance to a screen of the video 200-1. If the video 200-1 played in the first receiving terminal 12-1 ends, the web content providing apparatus 10 executes the web application program 200-3, which provides the examination questions, through the third receiving terminal 12-3. However, the exemplary embodiments mentioned above are just for helping the understanding of the present disclosure, and are not limited thereto.

Figure 3:
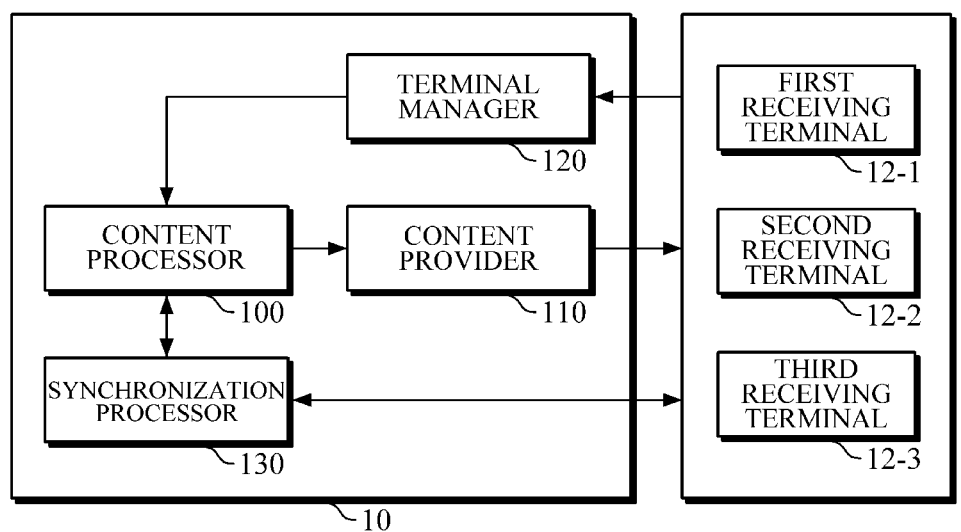
FIG. 3 is a diagram illustrating a web content providing apparatus according to an exemplary embodiment.

FIG. 3 is a diagram illustrating a web content providing apparatus according to an exemplary embodiment.

Referring to FIG. 3, a web content providing apparatus 10 includes a processor, which includes a content processor 100, a content provider 110, a terminal manager 120, and a synchronization processor 130.

The content processor 100 identifies web content items that are separable to be moved from a web page. Then, the content processor 100 assigns the web content to each of the receiving terminals 12-1, 12-2, and 12-3 by reflecting a terminal profile and a web content state of each of the receiving terminals 12-1, 12-2, and 12-3. Exemplary embodiments of the terminal profile are described later with reference to FIG. 7.

The content provider 110 provides the assigned web content to each of the receiving terminals 12-1, 12-2, and 12-3. The web content provided to each of the receiving terminals 12-1, 12-2, and 12-3 is different from each other. The content provider 110 may provide activation information for activating the web content, which is provided to each of the receiving terminals 12-1, 12-2, and 12-3, along with the web content to each of the receiving terminals 12-1, 12-2, and 12-3. The activation information includes the Element ID, the Document Object Module (DOM) path, a web application ID, and coordinates to be activated, etc., of the web content, so as to activate some parts of the web content in each of the receiving terminals.

The terminal manager 120 receives a terminal profile from each of the receiving terminals 12-1, 12-2, and 12-3. The terminal profile is used when the content processor 100 selects a receiving terminal to receive each web content.

The synchronization processor 130 generates a data channel for the activation between the web content provided to and executed in each of the receiving terminals 12-1, 12-2, and 12-3. In a case in which an event occurs in a specific receiving terminal, the synchronization processor 130 synchronizes the web content between each of the receiving terminals 12-1, 12-2, and 12-3 by transmitting a synchronization event to another registered receiving terminal.

Figure 4:
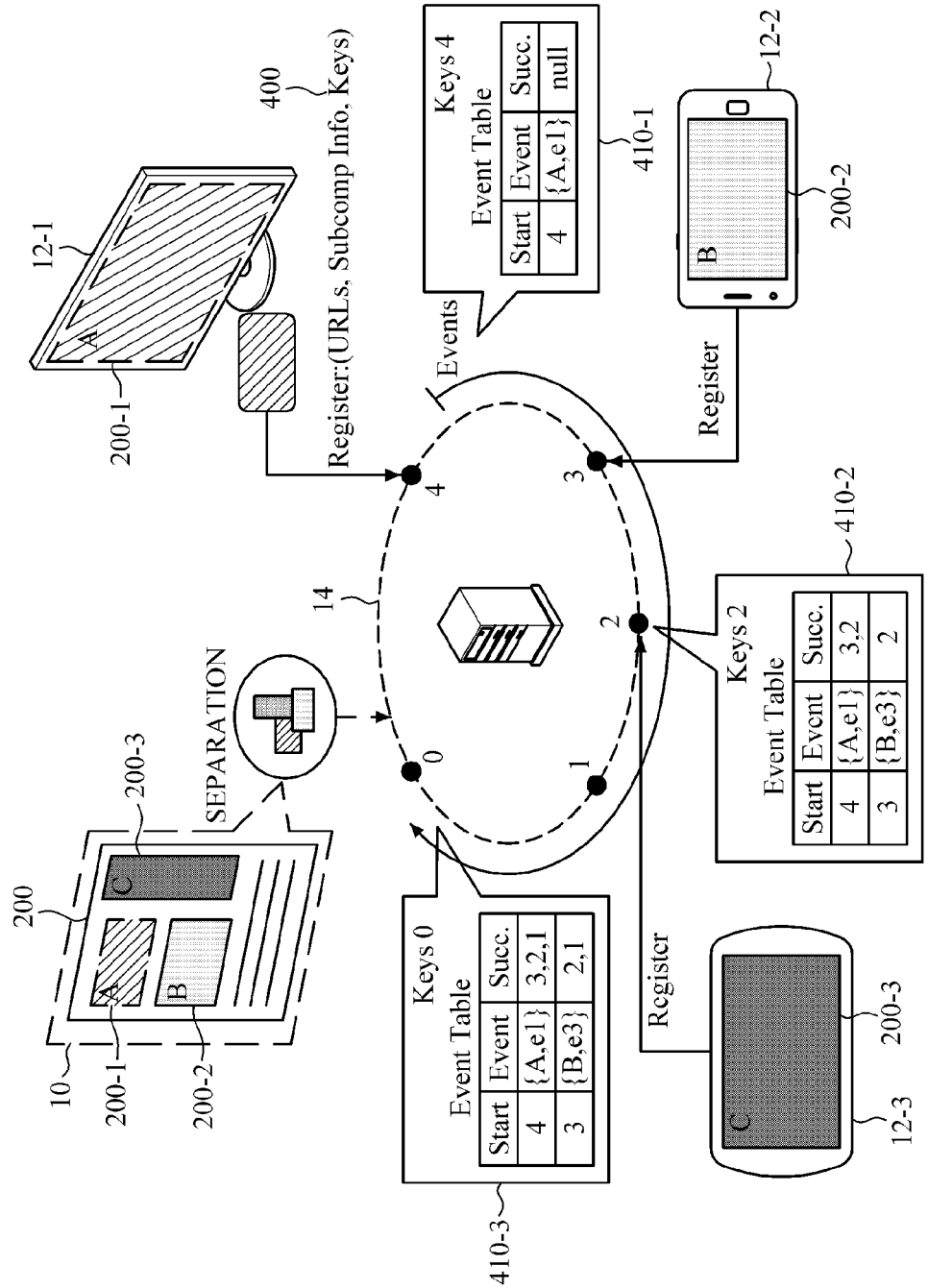
FIG. 4 is a diagram illustrating an example of data channel generation and synchronization according to an exemplary embodiment.

FIG. 4 is a diagram illustrating an example of data channel generation and synchronization according to an exemplary embodiment.

Referring to FIG. 4, a data channel 14 may use Web Socket, Web Real-Time Communication (WebRTC), TCP/IP, or User Datagram Protocol (UDP); and constraint conditions are not mentioned with regard to the data channel 14 in the present disclosure.

The web content providing apparatus 10 generates a data channel number with which the dispersed and provided web content items are capable of communicating, assigns a unique content key to each of the dispersed web content items, thereby supporting the event to be delivered through the content key between the web content. To receive the event, each of the receiving terminals 12-1, 12-2, and 12-3 goes through a process 400 of registering to the data channel 14. In the registration process 400, each of the receiving terminals 12-1, 12-2, and 12-3 may register in advance, to the data channel 14, registration information including a data URL, activated component information (Subcomp Info), and the content keys (Keys) that have been assigned from the web content providing apparatus 10.

Afterwards, in a case in which the state of the specific receiving terminal is changed to generate an event, the web content providing apparatus 10 generates an event table where the changed state is reflected, and shares the generated event table between each of the receiving terminals 12-1, 12-2, and 12-3 through the data channel 14. Each of the receiving terminals 12-1, 12-2, and 12-3 may forward the event table to another receiving terminal through the data channel 14. When forwarding, an identifier of the receiving terminal that completes reception of the event may be additionally recorded in the event table.

The event table 410-1, 410-2, and 410-3 may be periodically updated. In a case in which all the receiving terminals 12-1, 12-2, and 12-3 within the data channel 14 receive event tables 410-1, 410-2, and 410-3, the web content providing apparatus 10 may delete the event tables 410-1, 410-2, and 410-3 and maintain the minimum information for the synchronization.

In an exemplary embodiment, an identifier (Start) of the receiving terminal that generates the event, the generated event (e.g., {A, e1}, {B, e3}), an identifier (Succ.) of the receiving terminal that completes the reception of the event, etc., are recorded in the event tables 410-1, 410-2, and 410-3. For the synchronization of each of the receiving terminals 12-1, 12-2, and 12-3, the web content providing apparatus 10 may distribute the time information, which is a standard, to each of the receiving terminals 12-1, 12-2, and 12-3; and each of the receiving terminals 12-1, 12-2, and 12-3 performs a task of setting the synchronization time by comparing the received standard time information with its local time. When an event occurs in the receiving terminal, the event table may be transmitted including the time information of when the event has occurred, thus the event table may be changed to be used in accordance to each service.

Figure 5:
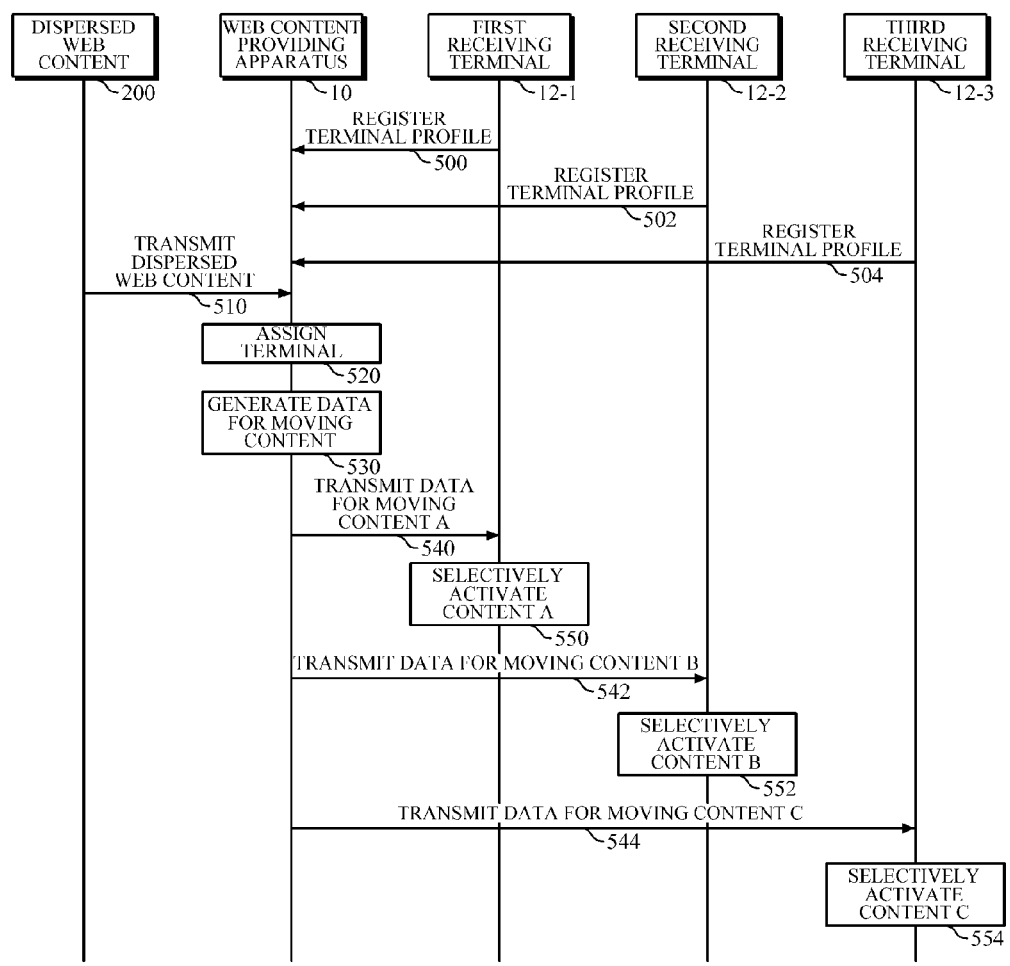
FIG. 5 is a diagram illustrating a process for separating and moving web content according to an exemplary embodiment.

FIG. 5 is a diagram illustrating a process for separating and moving web content according to an exemplary embodiment.

Referring to FIG. 5, each of receiving terminals 12-1, 12-2, and 12-3 registers a terminal profile to a web content providing apparatus 10 in 500, 502, and 504. In the terminal profile, model information, a screen size, resolution, a preferred content type of the receiving terminals, and a receiving terminal capability are described. If the web content providing apparatus 10 is requested for providing the dispersed web content, each of the receiving terminals 12-1, 12-2, and 12-3 reflects information on the registered terminal profile, a type of the web content, and a required function, etc., selects the optimum receiving terminal to receive each of the web content items, and assigns the web content to each of the selected receiving terminals in 520.

Subsequently, the web content providing apparatus 10 generates data for moving each of the selected web content items to each of the receiving terminals in 530, and moves the assigned web content to each of the receiving terminals 12-1, 12-2, and 12-3 in 540, 542, and 544. At this time, the web content providing apparatus 10 transmits the assigned web content to each of the receiving terminals, along with activation information for activating the web content, which enables the each of the receiving terminals 12-1, 12-2, and 12-3 to activate a part of the web content in 550, 552, and 554. To activate a part of the web content, the Element ID, the Document Object Module (DOM) path, a web application ID, and coordinates to be activated, etc., of the web content, may be used.

FIG. 6 is a diagram illustrating a synchronization process according to an exemplary embodiment.

Referring to FIG. 6, in a case in which web content movement to each of the receiving terminals 12-1, 12-2, and 12-3 is completed, a web content providing apparatus 10 assigns a data channel for an information exchange between the dispersed web content in 600. The web content providing apparatus 10 notifies the data channel to each of the receiving terminals 12-1, 12-2, and 12-3, and assigns a unique content key to each of the web content items in 610, 612, and 614. Each of the receiving terminals 12-1, 12-2, and 12-3 registers an event listener to the data channel in 620, 622, and 624, and if an event occurs, a listener for the processing may be called.

In a case in which a synchronization event occurs in a predetermined receiving terminal, the receiving terminal notifies the event occurrence of the web content providing apparatus 10 in 630 and 632, and the web content providing apparatus 10 that has received the event occurrence generates an event table in 640. The event table includes a number of a receiving terminal that has transmitted the event, a content ID that has generated the event, and time information on the event occurrence, along with the event content. The event table is delivered for the web content synchronization to each of the receiving terminals 12-1, 12-2, and 12-3 in 650; and each of the receiving terminals 12-1, 12-2, and 12-3 analyzes the received event and synchronizes a content state in 660, 662, and 664. Through addition of the time information to the synchronization event, the time information may be compared with a local time at the time of reception; and through usage of the difference value, a precise time point synchronization of each of the web content items may be performed.

FIG. 7 is a diagram illustrating a terminal profile according to an exemplary embodiment.

Referring to FIG. 7, the terminal profile may include a receiving terminal name (DeviceName), a receiving terminal nickname (DeviceNickName), receiving terminal model information (DeviceModel), a receiving terminal size (DeviceScreenSize), receiving terminal resolution (DeviceResoulution), a preferred content type (PreferredContentType), a type and version of a web browser installed in the receiving terminal (WebBrowserVer), and a receiving terminal capability (DeviceCapability), etc. For example, the preferred content type may be a movie, sounds, a web application program (WebApp), a text, a voice call, and a video call, etc. For example, the receiving terminal capability may be a sound (sound play), a microphone (mic), a phone function (phone), a camera, a speaker, Global Positioning System (GPS), and a sensor (motion).

FIG. 8 is a diagram illustrating an event table according to an exemplary embodiment.

Referring to FIG. 8, the event table includes an event type (EventType), a terminal identifier that has transmitted event (EventSenderID), a channel identifier (ChannelID), a content key value (KeyValue), an event number (eventNum), a terminal identifier (receiverID) that completes reception of the event, an identifier (DContentID) of content to be synchronized, and event content, etc.

In an exemplary embodiment, a plurality of web content items is separated from a web page, and the separated web content is dispersed and moved to each of the receiving terminals, thus increasing utilization through a multi-mode collaboration. Here, through the synchronization between the dispersed and moved web content, the web content dispersed and moved to each of the receiving terminals is capable of being synchronized after the movement, thus maintaining connectivity between the separated web content.

Furthermore, without an installation of an additional application in each of the receiving terminals, the various web application programs may be easily dispersed and distributed to the receiving terminals and be executed, thereby having advantages in the usage or management side, through which application services of various forms may be possible.

Particularly, in case of E-learning usage, a web-based system, including a video for a lecture, a presentation material for a lecture, and questions for evaluation may be dispersed to each of the receiving terminals that a student possesses and be executed; and according to a point in time playing the video content, the web-based system may control the presentation material content for a page to be automatically turned, or a web application program, which gives an examination at a time when the lecture is finished, to be automatically executed.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A web content sharing method of a web content providing apparatus, the web content sharing method comprising:
   separating, by the web content providing apparatus, a plurality of web content items displayed on the web content providing apparatus from a web page;
   dispersing and providing respective web content of the plurality of the separated web content items by the web content providing apparatus to each receiving terminal; and
   synchronizing over a common data channel coupled to each receiving terminal the plurality of web content items that has been dispersed to, displayed on, and executed in each of the receiving terminals.

2. The web content sharing method of claim 1, wherein each of the plurality of web content items is one web application program that is separable from the web page.

3. The web content sharing method of claim 1, wherein each of the plurality of web content items is implemented with a module where an event is capable of being operated in association with other events between components.

4. The web content sharing method of claim 1, wherein the synchronizing of the plurality of web content items comprises synchronizing content information that indicates states of the plurality of web content items dispersed to each of the receiving terminals.

5. The web content sharing method of claim 1, wherein the synchronizing of the plurality of web content items further comprises:
   generating the common data channel for synchronization between the plurality of dispersed web content items;
   assigning the generated common data channel to each of the receiving terminals and assigning a content key for each of the plurality of web content items dispersed to each of the receiving terminals;
   generating an event table in response to reception of an event occurrence message from a specific receiving terminal where the event has occurred; and
   sharing the generated event table between each of the receiving terminals through the common data channel.

6. The web content sharing method of claim 5, wherein the event table comprises an identifier of a specific receiving terminal transmitting the event; an identifier of a specific web content item where the event has occurred; time information on the event occurrence; an identifier of a specific receiving terminal completing reception of the event; and event content.

7. The web content sharing method of claim 5, wherein the synchronizing of the plurality of web content items further comprises deleting the event table in a case in which all the receiving terminals receive the event table through the common data channel.

8. The web content sharing method of claim 1, wherein:
   the separating of the plurality of web content items comprises separating a video for a lecture, a presentation material for a lecture, and a web application program that executes questions for evaluation from the web page;
   the dispersing and providing of the plurality of separated web content items comprises providing the separated video to a first receiving terminal, the separated presentation material to a second receiving terminal, and the separated web application to a third receiving terminal; and the synchronizing of the plurality of web content items comprises changing the presentation material, which is displayed on the second receiving terminal, according to a point in time when the video that is being played in the first receiving terminal is played, and in response to ending of the video played in the first receiving terminal, executing the web application program through the third receiving terminal.

9. A web content sharing method of a web content providing apparatus, the web content sharing method comprising:

receiving a terminal profile from each of receiving terminals;

separating, by the web content providing apparatus, a plurality of web content items displayed on the web content providing apparatus from a web page;

assigning respective web content items to each of the receiving terminals by reflecting the terminal profile in the plurality of separated web content items; and providing the plurality of assigned web content items to each of the receiving terminals over a common data channel coupled to each receiving terminal.

10. The web content sharing method of claim 9, wherein the terminal profile comprises at least one of a receiving terminal name, a receiving terminal nickname, receiving terminal model information, a receiving terminal size, receiving terminal resolution, a preferred content type, a type and version of a web browser installed in the receiving terminal, and a receiving terminal capability.

11. The web content sharing method of claim 9, further comprising:

providing the plurality of web content items to each of the receiving terminals along with activation information for selectively activating the plurality of web content items.

12. A web content sharing method of a receiving terminal, the web content sharing method comprising:

receiving respective web content, displayed on a web page of a web content providing apparatus, and separated from the web page by the web content providing apparatus, from the web content providing apparatus; and synchronizing over a common data channel coupled to each receiving terminal the received respective web content with another web content that is separated from the web page by the web content providing apparatus and provided to another receiving terminal by the web content providing apparatus.

13. The web content sharing method of claim 12, wherein the receiving of the web content comprises:

registering the terminal profile to the web content providing apparatus;

receiving the web content, which is assigned by the web content providing apparatus, by reflecting the terminal profile; and selectively activating the received web content.

14. The web content sharing method of claim 12, wherein the synchronizing of the received web content with another web content comprises:

receiving assignment of the common data channel and a content key from the web content providing apparatus; and sharing, through the data channel, content information that indicates a state of web content executed in each of receiving terminals.

15. The web content sharing method of claim 14, wherein the sharing of the content information comprises sharing an event by transmitting an event table, generated by the web content providing apparatus, between each of the receiving terminals, wherein the event table comprises an identifier of a specific receiving terminal transmitting the event; an identifier of specific web content where the event has occurred; time information on the event occurrence; an identifier of a specific receiving terminal completing reception of the event; and event content.

16. The web content sharing method of claim 14, wherein the synchronizing of the received web content with other web content further comprises:

registering, to the data channel, a data URL, activated component information, and information on the content key assigned from the web content providing apparatus.

17. The web content sharing method of claim 1, wherein the subset of fewer than all the web content items are provided to each of the receiving terminals such that all the web content items are provided to all the receiving terminals, and each of the receiving terminals displays the subset of all the web content items.

18. The web content sharing method of claim 1, wherein the web content provided to and displayed on each of the receiving terminals is different, and all the web content provided to and displayed on the receiving terminals is displayed on the web content providing apparatus.

19. The web content sharing method of claim 1, wherein the web content providing apparatus selects an optimum receiving terminal for each web content item and assigns each web content item to a different receiving terminal.

* * * * *